No. 612,635. Patented Oct. 18, 1898.
A. TAYLOR.
APPARATUS FOR COOLING WATER.
(Application filed Mar. 13, 1897.)
(No Model.)

Witnesses
J. B. Reinhardt,
Mrs. Mollie L. Reinhardt.

Inventor,
Asa Taylor,

UNITED STATES PATENT OFFICE.

ASA TAYLOR, OF ATTICA, KANSAS.

APPARATUS FOR COOLING WATER.

SPECIFICATION forming part of Letters Patent No. 612,635, dated October 18, 1898.

Application filed March 13, 1897. Serial No. 627,318. (No model.)

*To all whom it may concern:*

Be it known that I, ASA TAYLOR, a citizen of the United States, residing at Attica, in the county of Harper and State of Kansas, have invented certain new and useful Improvements in Apparatus for Cooling and Filtering Water; and I do hereby declare the following to be a full, clear, and exact description of the invention, such as will enable others skilled in the art to which it appertains to make and use the same.

This invention relates to improvements in apparatus for cooling water or any liquid on its way to the discharge-spout.

The object of the invention is to provide an apparatus of this character having suitable openings for the attachment of the supply pipe or pipes, a part of the water passing into a pipe or cylinder which is extended a considerable distance into the ground to cool the water on its way to a reservoir and its discharge-pipe that leads to the outlet, valves being provided and suitably located to properly control the discharge of water.

With the above ends in view the invention consists in providing a cooler with proper openings for attaching the supply pipe or pipes, a pipe or cylinder carrying the water a considerable distance into the ground, and a smaller pipe to conduct the cooled water to the discharge-spout.

The invention further consists in providing a second discharge-pipe which may be connected to the source of supply and provide water for ordinary uses not cooled.

The invention further consists in the particular construction and arrangement of the parts, as will be hereinafter fully set forth, and specifically pointed out in the claims.

Figure 1:
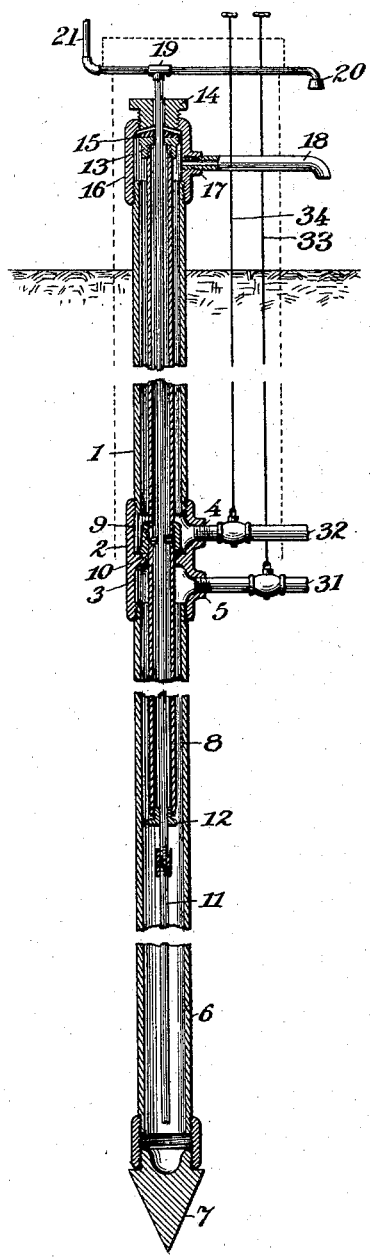
Figure 2:
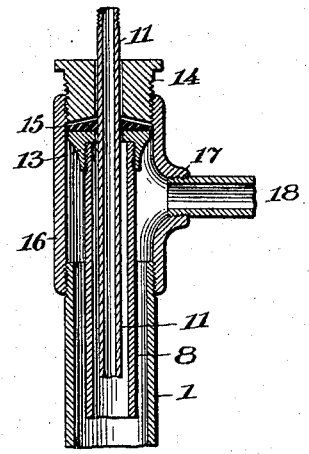
Figure 3:
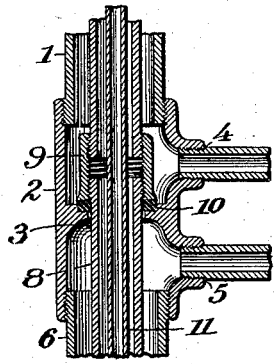
Figure 4:
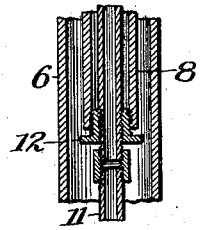

In the accompanying drawings, forming part of this specification, Figure 1 is a vertical sectional view through the apparatus. Fig. 2 is a sectional view, on an enlarged scale, showing the connections at the discharge end of the apparatus. Fig. 3 is a similar view of the coupling for connecting the supply-pipes to the cooling-cylinder and pipe leading upward to one of the discharge-spouts, including the manner of passing the discharge-pipe for the cooled water through the coupling. Fig. 4 is a similar view showing the manner of connecting the discharge-pipe for the cooled water to the pipe or tube which incloses the same.

In the accompanying drawings the numeral 1 designates the upper pipe or cylinder, which is connected at its lower end to a coupling 2, said coupling having a horizontal partition 3 and openings 4 and 5 through the sides thereof above and below the partition 3. This coupling is also attached to a cylinder 6, which depends therefrom and is provided at its lower end with a tapered head or point 7, the pipe or cylinder 6 being driven or let into the ground to a considerable depth, the point 7 being provided in case it is desired to drive the pipe. Within the pipes 1 and 6 and extending through the horizontal partition 3 is a pipe 8, having a collar or coupling 9, the lower end of which rests upon the said partition or upon an interposed packing 10. This pipe 8 is of less diameter than the pipes 1 and 6 and terminates at its lower end a considerable distance above the lower end of the latter. The said pipe 8 incloses a portion of pipe 11 of very small diameter. This pipe passes through a plug 12 at the lower end of the pipe 8 and extends nearly to the bottom of pipe 6. Upon the upper end of the pipe 8 is a cap 13, upon which bears a plug 14, which also indirectly bears upon partition 3 by collar 9 with interposed packings 10 and 15, the cap, packings, and plug being vertically apertured to provide for the passage therethrough of the pipe 11. The plug 14 fits within the upper end of a coupling 16, attached to the pipe or cylinder 1, said coupling having an opening 17 for connecting thereto a discharge-spout 18, while the upper end of pipe 11 has a T-shaped coupling 19, connecting a spout 20 and distributing-pipe 21. By this arrangement of piping it will be understood that the opening 4 of the coupling 2 communicates directly with a space leading to the discharge-spout 18, while the opening 5 in said coupling communicates with the pipe 6, which extends into the ground, the latter communicating with the discharge-spout 20 by way of the inner pipe 11. The pipe 8, which surrounds this inner pipe 11, is merely provided to form a dead-air space in order that the water contained within the pipes 1 and 6 will not come in contact with the upper section of pipe 11, which conducts the cooled water from the lower end of the pipe or cylinder 6 to the discharge-spout 20. To this system of piping any filterer may be attached or the cooler may be used alone, if preferred.

By providing an apparatus as herein shown and described water from any supply may be conducted to a point a considerable distance below the surface of the earth to be thereby cooled and then drawn from the discharge-pipe as it returns to the surface for drinking purposes or other uses. For instance, the water will enter the cooler through opening 5, filling pipe 6 and finding exit through the discharge-pipe 11 and spout 20 when the rod 33 is operated to open the valve in pipe 31. It will be understood, of course, that the pipe or cylinder 6 is so much larger in comparison with the pipe 11 that the water which enters the cylinder is given time to thoroughly cool before it arrives at the inlet end of pipe 11, and by providing the pipe 8, which incloses the upper part of said pipe 11, a dead-air space is formed, which prevents the water which enters through the pipe 31 coming in direct contact with the pipe 11. By this arrangement the water is conducted to the storage cylinder or reservoir located a considerable distance below the surface of the ground. In case the water which passes into the device is extremely cold, as would be the case in winter weather, it is brought to the proper temperature before reaching the lower part of this cylinder or pipe 6, thus providing an apparatus which will discharge water at an even temperature at all times. The water from the source of supply may be filtered, if desired, before it is passed through the cooler, and it may be carried directly to a discharge-spout without cooling for washing or other purposes. The valve in pipe 31 is used when it is desired to cool the water and the valve in pipe 32 is used when desiring to draw the water direct from the supply, the water finding an exit at the discharge-spout 18.

The upper part of the apparatus is preferably inclosed within a boxing, as shown, having openings for the discharge-spouts and a cap with vertical apertures, through which the operating-rods pass. This arrangement practically provides a hydrant which furnishes water for ordinary uses and also cold filtered water for drinking or other purposes.

The box which surrounds the upper part of the apparatus may be packed with sawdust or any other material which will prevent the water in the pipes freezing in winter or becoming warm in summer.

Having thus described my invention, what I claim as new, and desire to secure by Letters Patent, is—

1. In an apparatus for cooling water or other liquids, of a pipe or cylinder extending to a considerable distance below the surface of the earth, a second pipe located therein and terminating above the lower end thereof, and a smaller pipe inclosed within the second pipe and opening near the lower end of the first-mentioned pipe, said smaller pipe having a discharge-spout at its upper end; together with valves interposed between the supply and the upper and lower portions of the outer pipe, and a partition in the outer pipe between the connections therewith of the water-supply pipes, substantially as shown and for the purpose set forth.

2. In an apparatus for cooling water of a pipe or cylinder having a horizontal partition and extending into the ground to a considerable distance, a second pipe located therein and extending through the partition, and a smaller pipe the upper portion of which is inclosed within the second pipe terminating at a suitable distance above and opening into the lower end of the cylinder, spouts connected to the upper ends of the outer and inner pipes; together with supply-pipes and valves having connection by which the water is conveyed to either the outer pipe below the partition therein and its outlet, or conducted to said outer pipe or cylinder and its outlet above the partition, substantially as shown and described.

3. In an apparatus for cooling water, of a pipe or cylinder extending to a considerable distance below the surface of the earth to or forming a reservoir, said pipe having a horizontal partition therein, a pipe located within the aforesaid pipe or cylinder and extending through the partition, and discharge-spouts attached to the upper ends of the pipes; together with supply-pipes and valves which connect with the outer pipe or cylinder for conducting a part of the water above the partition and the water to be cooled below the same, substantially as shown and for the purpose set forth.

In testimony whereof I have signed this specification in the presence of two subscribing witnesses.

ASA TAYLOR.

Witnesses:
D. H. B. COSWELL,
JAS. MASON.